United States Patent
Jansohn et al.

(10) Patent No.: US 9,634,353 B2
(45) Date of Patent: Apr. 25, 2017

(54) LOW INTERNAL RESISTANCE BETA—AND BETA"—ALUMINA ELECTROLYTE PRODUCED VIA VAPOR PHASE METHOD

(71) Applicant: Na4B, LLC, Rochester Hills, MI (US)

(72) Inventors: Monika Jansohn, Rochester Hills, MI (US); Cord-Henrich Dustmann, Sagno (CH); Wolfgang Jansohn, Rochester Hills, MI (US)

(73) Assignee: Na4B, LLC, Rochester Hills, MI (US)

( * ) Notice: Subject to any disclaimer, the term of this patent is extended or adjusted under 35 U.S.C. 154(b) by 134 days.

(21) Appl. No.: 14/356,915

(22) PCT Filed: Nov. 8, 2012

(86) PCT No.: PCT/US2012/064065
§ 371 (c)(1),
(2) Date: May 8, 2014

(87) PCT Pub. No.: WO2013/070851
PCT Pub. Date: May 16, 2013

(65) Prior Publication Data
US 2014/0315101 A1    Oct. 23, 2014

Related U.S. Application Data

(60) Provisional application No. 61/557,399, filed on Nov. 8, 2011.

(51) Int. Cl.
*H01M 10/0562* (2010.01)
*H01M 10/39* (2006.01)
*H01M 10/054* (2010.01)

(52) U.S. Cl.
CPC ..... *H01M 10/0562* (2013.01); *H01M 10/054* (2013.01); *H01M 10/39* (2013.01);
(Continued)

(58) Field of Classification Search
CPC ......... H01M 10/3909; H01M 10/3927; H01M 10/0562; H01M 10/054; H01M 10/39;
(Continued)

(56) References Cited

U.S. PATENT DOCUMENTS 3,870,561 A * 3/1975 Charbonnier ........... F21L 14/00
429/102
4,244,986 A * 1/1981 Paruso .............. H01M 10/3927
423/600

(Continued)

FOREIGN PATENT DOCUMENTS

EP    2178150 A1    4/2010
SU    1777655       11/1992

*Primary Examiner* — Milton I Cano
*Assistant Examiner* — Jennifer A Moss
(74) *Attorney, Agent, or Firm* — Dinsmore & Shohl LLP

(57) ABSTRACT

A process for making a solid electrolyte for an electrochemical cell. The process includes providing a multilayer material having a porous layer and a nonporous layer, the nonporous layer containing a first oxide selected from alpha-alumina, gamma-alumina, alpha-gallium oxide, and/or combinations thereof. In addition, an alkali-metal oxide vapor is provided and the nonporous layer is exposed to the alkali-metal oxide vapor at an elevated temperature such that the nonporous layer is converted to a solid second oxide electrolyte layer that is conductive to alkali metal ions. The second oxide is an alkali-metal-beta-alumina, alkali-metal-beta"-alumina, alkali-metal-beta-gallate, and/or alkali-metal-beta"-gallate.

12 Claims, 7 Drawing Sheets

(52) U.S. Cl.
CPC ... *H01M 10/3909* (2013.01); *H01M 10/3927* (2013.01); *H01M 2300/0071* (2013.01)

(58) Field of Classification Search
CPC ......... H01M 2300/0071; C04B 35/652; C04B 35/113
See application file for complete search history.

(56) References Cited

U.S. PATENT DOCUMENTS

| | | | | |
|---|---|---|---|---|
| 4,348,468 A | * | 9/1982 | Wright | H01M 10/3909 427/123 |
| 5,415,127 A | * | 5/1995 | Nicholson | C30B 25/02 117/84 |
| 2003/0087752 A1 | | 5/2003 | Virkar et al. | |

* cited by examiner

LOW INTERNAL RESISTANCE BETA—AND BETA"—ALUMINA ELECTROLYTE PRODUCED VIA VAPOR PHASE METHOD

CROSS-REFERENCE TO RELATED APPLICATIONS

This application is the U.S. national phase of PCT/US2012/064065 filed Nov. 8, 2012, which claims priority to U.S. Provisional Patent Application No. 61/557,399 filed on Nov. 8, 2011, which is incorporated in its entirety by reference.

FIELD OF THE INVENTION

The present invention is related to a process for making a solid electrolyte for an electrochemical cell, and in particular to a process for making a solid electrolyte having a multilayer material with a porous layer and a nonporous layer.

BACKGROUND OF THE INVENTION

The use of alkali-metal-beta-alumina as an electrolyte for sodium sulfur batteries and alkali-metal halide batteries is known. In addition, alkali-metal-beta-alumina electrolytes are known to be conductive to sodium ions and used in sodium sulfur batteries with liquid sodium as the anode, sulfur or sodium polysulfide as the cathode, and an alkali-metal-beta-alumina electrolyte separating the anode from the cathode. Furthermore, it is known that the operating temperature for such sodium sulfur batteries is typically selected to be between 300-350° C. and such batteries can achieve several thousand charge/discharge cycles.

Regarding alkali-metal halide batteries, a liquid anode of metallic sodium and a solid cathode of porous nickel chloride impregnated with sodium tetrachloro aluminate are known to be used. Similar to the sodium sulfur batteries, the anode and the cathode are separated by an alkali-metal-beta-alumina electrolyte.

Such batteries as discussed above are used in transportation, e.g. electric vehicles, locomotives, etc., as well as in stationary energy storage applications. However, current processes for making the alkali-metal-beta-alumina electrolyte require a sintering process that is time consuming, cost intensive, and thus result in the production of the electrolyte being the largest single cost for the manufacture of sodium sulfur electrochemical cells. In addition, such processing to produce alkali-metal-beta-alumina electrolyte components results in a large grain size for the material which corresponds to low mechanical strength and the presence of the sinter-formed $NaAlO_2$ phase along the grain boundaries making the material susceptible to moisture. Other problems known to exist for current state of the art alkali-metal-beta-alumina electrolyte components for sodium sulfur batteries and alkali-metal halide batteries include rigidity of the electrolyte, large electrolyte thickness which results in a low power-to-energy ratio and high internal resistance, high operating temperatures, and the like. Therefore, an improved process for manufacturing an electrolyte for a sodium sulfur battery and/or an alkali-metal halide battery would be desirable.

SUMMARY OF THE INVENTION

A process for making a solid electrolyte for an electrochemical cell is provided. The process includes providing a multilayer material having a porous layer and a nonporous layer, the nonporous layer containing a first oxide selected from alpha-alumina, gamma-alumina, alpha-gallium oxide, and/or combinations thereof. In addition, an alkali-metal oxide vapor is provided and the nonporous layer is exposed to the alkali-metal oxide vapor at an elevated temperature such that the nonporous layer is converted to a solid second oxide electrolyte layer that is conductive to alkali metal ions. The second oxide is an alkali-metal-beta-alumina, alkali-metal-beta"-alumina, alkali-metal-beta-gallate, and/or alkali-metal-beta"-gallate. In some instances, the solid electrolyte can have an alkali-metal ion conductive layer extending thereacross in order to provide improved wettability with an alkali metal anode material. The alkali-metal ion conductive layer can be lead, a zintl phase material, and the like.

The alkali-metal oxide vapor can include one or more of sodium oxide, lithium oxide, potassium oxide, rubidium oxide, cesium oxide, and combinations thereof. In addition, the solid second oxide electrolyte layer is conductive to ions associated with the alkali-metal oxide vapor, i.e. sodium ions, lithium ions, potassium ions, rubidium ions, cesium ions, and combinations thereof.

In one embodiment of the inventive process, the alkali-metal oxide vapor contains sodium oxide and potassium oxide and the solid second oxide electrolyte layer is conductive to sodium ions and potassium ions. In addition, the alkali-metal oxide vapor can contain a stabilizing ion with a valence equal to or less than an element of the boron group from the periodic table (e.g. boron, aluminum, gallium, indium and/or thallium) in order to make the solid second oxide electrolyte layer more conductive to alkali-metal ions of the alkali-metal oxide vapor. The stabilizing ion can also be lithium, magnesium, and combinations thereof.

The elevated temperature at which the nonporous layer containing the first oxide is exposed to the alkali-metal oxide vapor can be equal to or less than 1350° C., or in the alternative equal to or less than 800° C., or in another alternative equal to or less than 700° C.

The multilayer material can be in the form of an anodic aluminum oxide membrane and the alkali-metal oxide vapor can be exposed to only a barrier surface of the anodic aluminum oxide membrane. In this manner, only a thin layer of the anodic aluminum oxide membrane is converted to the solid second oxide electrolyte layer.

In some instances, the multilayer material is formed by providing a porous base layer and applying a nonporous thin film of the first oxide onto the porous base layer. The porous base layer can be a carbon-nanofoam, a porous alpha-alumina, a porous gamma-alumina, a porous alpha-gallium oxide, and combinations thereof.

A solid second oxide electrolyte manufactured according to the process is also included in the invention as well as an electrochemical cell having the solid second oxide electrolyte manufactured according to the process. The electrochemical cell can have an anode material that contains two or more alkali metals in a liquid state (i.e. a liquid alloy) with the solid second oxide electrolyte conducting ions of the two or more alkali metals at a ratio that prevents solidification of the liquid alloy during operation of the electrochemical cell. For example, the anode material can be a liquid sodium-potassium alloy and the solid second oxide electrolyte can conduct sodium ions and potassium ions at a ratio that prevents solidification of the liquid sodium-potassium alloy during operation of the electrochemical cell at ambient temperatures and below. It is appreciated that ambient temperatures can include temperatures such as 25° C., 20° C., and the like.

DETAILED DESCRIPTION OF THE INVENTION

The present invention provides a process for producing or manufacturing a solid electrolyte for an electrochemical cell. In addition, the present invention provides for a component made according to the process. As such, the process and the component have use for producing electrochemical cells such as batteries.

The process includes converting a nonporous layer of a first oxide into a thin, dense, nonporous layer of a second oxide using a vapor method. In particular, the nonporous layer of the first oxide can be a layer of alpha-alumina, gamma-alumina, alpha-gallium oxide, and/or combinations thereof. In addition, the vapor can be an alkali-metal oxide vapor which is brought into contact with the nonporous first oxide layer at an elevated temperature and affords for the conversion of the layer into a nonporous solid second oxide electrolyte layer. The solid second oxide electrolyte layer is an alkali-metal-beta-alumina layer, alkali-metal-beta"-alumina layer, alkali-metal-beta-gallate layer, alkali-metal-beta"-gallate layer, and/or combinations thereof, that is conductive to alkali-metal ions. In some instances, the nonporous first oxide layer can be exposed to a vapor containing two or more alkali metal oxides and the solid second oxide electrolyte layer can be conductive to two or more alkali metal ions. In this manner, a preform or precursor having a desired shape, thickness, and the like but not necessarily having desired ion conductive properties is converted to a solid electrolyte with desirable ion conductive properties, mechanical properties, and the like.

The solid second oxide electrolyte layer can be part of a sodium sulfur battery, alkali-metal halide battery, etc. Such batteries are known to have an anode material on one side of the solid electrolyte and a cathode material on an opposite side of the solid electrolyte. Furthermore, the cathode material can be incorporated within a porous layer/material that is adjacent to the nonporous solid second oxide electrolyte layer. Such porous material can include carbon-nanofoam material, porous alpha-alumina, porous gamma-alumina, porous alpha-gallium oxide, and the like. In this manner, a thin, dense, and nonporous layer having desired alkali-metal ion conductive properties can be combined with a porous layer that provides desired mechanical strength, shape-retaining properties, etc. In addition, an alkali-metal ion conductive layer can extend across the thin, dense, solid second oxide electrolyte layer such that the wettability of an alkali metal anode material in relation to the solid electrolyte is improved.

Figure 1:
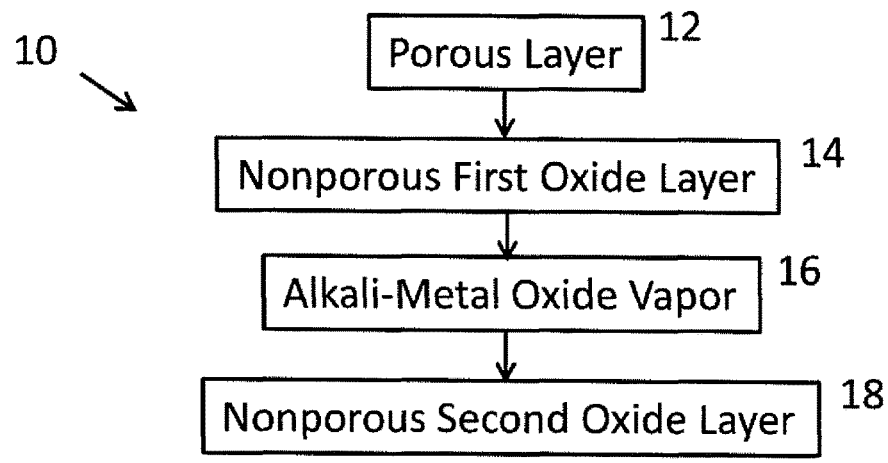
FIG. 1 is a schematic illustration of a process for manufacturing a solid electrolyte for an electrochemical cell according to an embodiment of the present invention.

Turning now to the figures, FIG. 1 illustrates a process for making a solid electrolyte for an electrochemical cell at reference numeral 10. The process 10 includes providing a porous layer at step 12 and a nonporous first oxide layer at step 14. It is appreciated that the porous layer and nonporous first oxide layer are connected by being of the same material and unified structure, or in the alternative, by placing the porous layer and nonporous first oxide layer into contact with each other as described in more detail below. An alkali-metal oxide vapor is provided at step 16 and brought into contact with the nonporous first oxide layer in order to produce a nonporous second oxide layer at step 18.

It should be appreciated that the porous layer and the nonporous layer can be provided in the same step. Also, the porous layer can be in the form of carbon-nanofoam, porous alpha-alumina, porous gamma-alumina, porous alpha-gallium oxide, and mixtures thereof.

The nonporous second oxide layer can be in the form of an alkali-metal-beta-alumina layer, an alkali-metal-beta"-alumina layer, an alkali-metal-beta-gallate layer, an alkali-metal-beta"-gallate layer, and the like. The alkali-metal oxide vapor can include vapor from sodium oxide, lithium oxide, potassium oxide, rubidium oxide, cesium oxide, and combinations thereof. In addition, the nonporous second oxide layer is conductive with respect to the alkali metal ions that are present in the oxide vapor and as such is conductive to sodium ions, lithium ions, potassium ions, rubidium ions, cesium ions, and combinations thereof.

Figure 2:
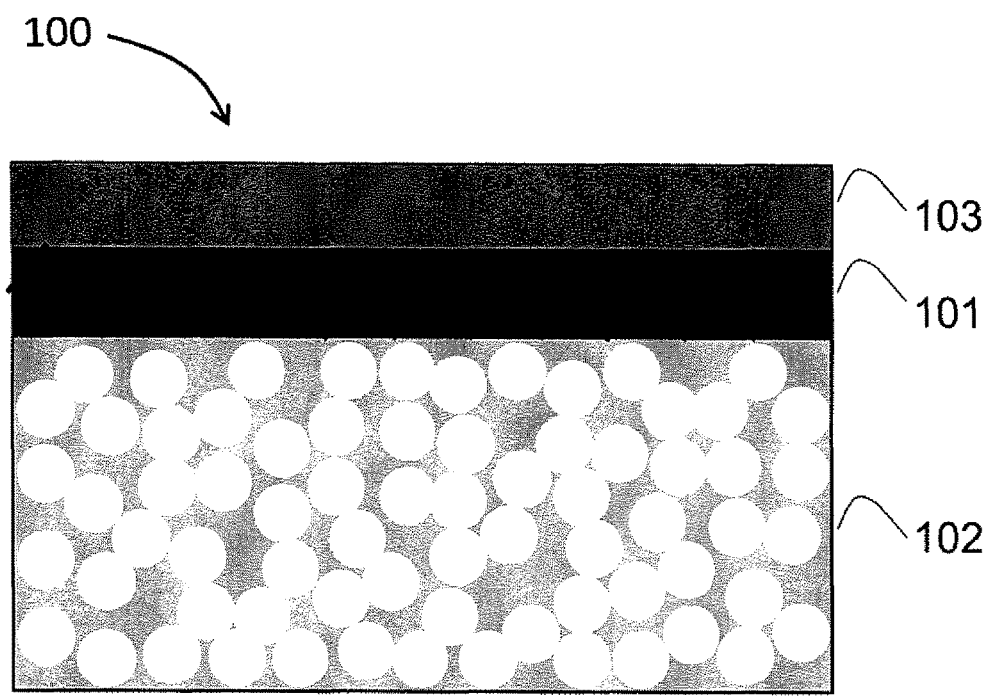
FIG. 2 is a schematic illustration of a cross-sectional view of a solid electrolyte made according to an embodiment of the present invention.

Turning now to FIG. 2, an embodiment of a solid electrolyte made according to an embodiment of the present invention is shown generally at reference numeral 100. The electrolyte 100 includes a nonporous layer 101 which separates an anode from a cathode. The nonporous layer 101 can be produced by the process 10 such that the layer 101 is the nonporous second oxide layer. In addition, a porous layer 102 can be adjacent to the nonporous layer 101 and be in the form of one or more porous materials as described above.

Finally, an alkali-metal ion conductive layer 103 can be provided and extend across the nonporous layer 101.

The conversion of the nonporous first oxide layer to the nonporous second oxide layer 101 can be afforded by a vapor phase made from heating a powder of alkali metal with or without stabilizer elements at temperatures such as 700° C., 800° C., and/or 1350° C. It should be appreciated that a higher conversion temperature can increase a conversion rate, but also increase alkali-metal evaporation loss as well as conversion of an alkali-metal-beta"-alumina layer 101 to a less preferred alkali-metal-beta-alumina layer. It should also be appreciated that the layer 101 can be formed by vapor coming into direct contact with the nonporous first oxide layer via a "top" side, or in the alternative, through the porous layer 102 via a "bottom" side. The terms "top side" and "bottom" side are used for illustration purposes only with relation to the figures. As such, the electrolyte 100 can be oriented such that the layer 101 is above the layer 102, below the layer 102, to the left of the layer 102 and/or to the right of the layer 102.

After the solid electrolyte 100 is formed, the structural stability of the multilayered electrolyte can be maintained by the porous layer 102. In this manner, a desired ion conductive layer 101 affords for low internal resistance of an electrochemical cell while the structural integrity/stability of the layer 101 is maintained by the porous layer 102. Furthermore, the alkali-metal ion conductive layer 103 can be applied to the layer 101 using any vapor deposition method known to those skilled in the art, or in the alternative a liquid dipping treatment.

Figure 3:
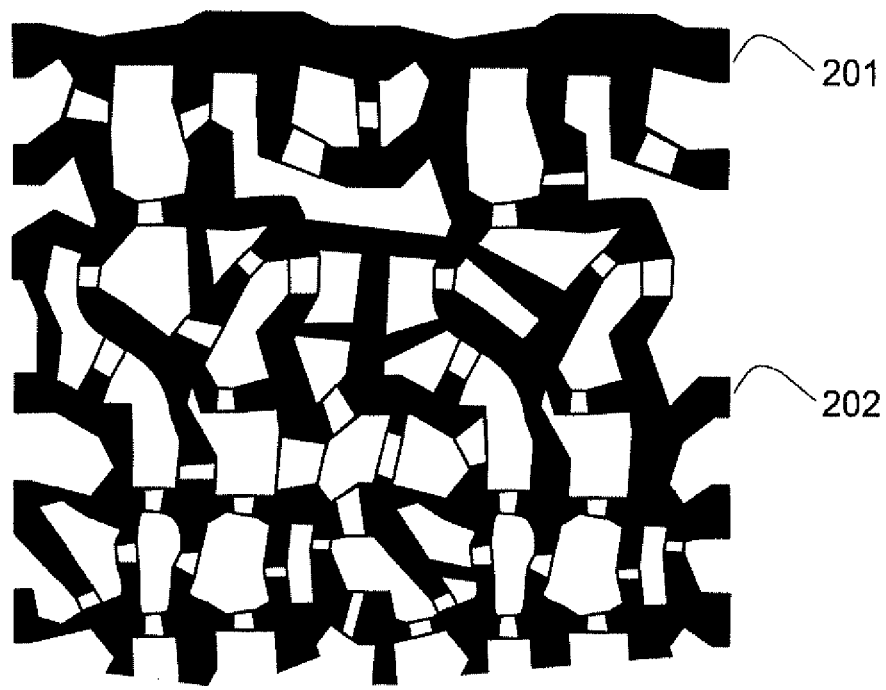
FIG. 3 is a schematic illustration of a cross-sectional view of an open-porous alpha-alumina foam with a thin, dense, nonporous solid first oxide layer.
Figure 4:
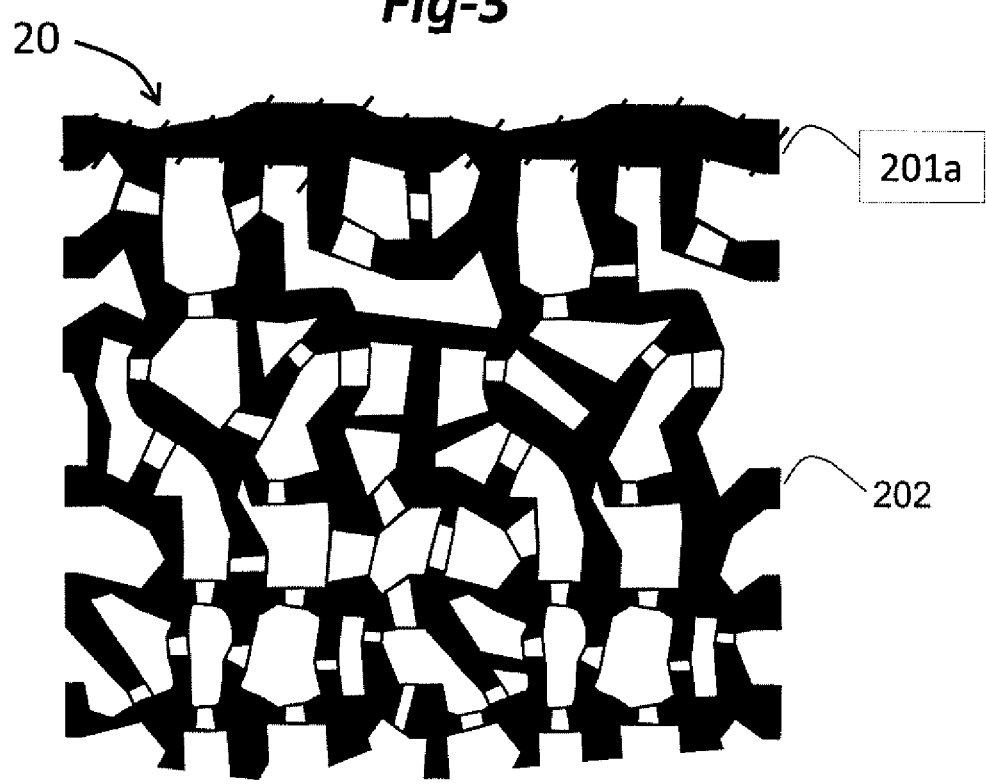
FIG. 4 is a schematic illustration of the cross-sectional view shown in FIG. 3 with a thin, dense, nonporous solid second oxide electrolyte layer that has been formed according to an embodiment of the present invention.

Turning now to FIGS. 3 and 4, another embodiment of a solid electrolyte is shown at reference numeral 20. FIG. 3 provides a cross-sectional view of a porous alpha-alumina precursor having a thin, dense alpha-alumina layer 201 extending across an open-porous alpha-alumina foam 202. Per an embodiment of the present invention, the layer 201 is exposed to an alkali-metal oxide vapor at an elevated temperature which subsequently transforms or converts the layer 201 into an alkali-metal-beta"-alumina layer 201a as illustrated in FIG. 4. In the alternative, the layer 201 can be converted or transformed into an alkali-metal-beta-alumina layer, alkali-metal-beta"-alumina layer or a mixture thereof 201a.

The dense alpha-alumina precursor layer 201 can be formed during the alpha-alumina foam production process, or in the alternative formed via a plasma assisted atomic layer deposition method, a vapor deposition method, and the like known to those skilled in the art. Such a precursor layer 201 can have a thickness of less than or equal to 50 nanometers and thus provide an extremely dense and thin precursor layer for conversion to layer 201a that has low internal resistance to the conduction of alkali-metal ions. Furthermore, even though the layer 201 can be very thin, its structural stability is maintained by the porous foam layer 202 adjacent thereto. Therefore, a combination of unique and desired properties for the thin layer 201 and the foam layer 202 is taken advantage of for the production of an improved solid electrolyte.

Figure 5:
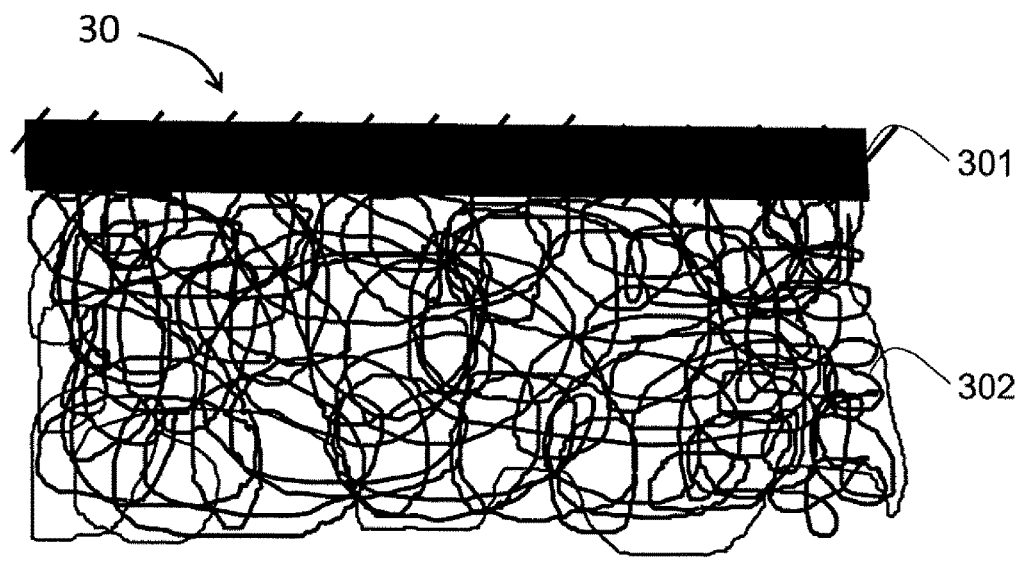
FIG. 5 is a schematic illustration of a cross-sectional view for a solid electrolyte having a porous layer and a thin, dense, nonporous solid second oxide electrolyte layer made according to an embodiment of the present invention.

Turning now to FIG. 5, a schematic illustration of a solid electrolyte is shown generally at reference numeral 30 in which a carbon-nanofoam layer 302 has a thin, dense first oxide layer that has been converted to a thin, dense second oxide layer 301. As shown by the figure, the layer 301 covers or extends across the porous layer 302. In addition, it should be appreciated that the layer 301 is initially a thin, dense layer of alpha-alumina, gamma-alumina, alpha-gallium oxide, and/or combinations thereof that is converted to the solid second oxide layer, the second oxide being an alkali-metal-beta-alumina, an alkali-metal-beta"-alumina, an alkali-metal-beta-gallate, an alkali-metal-beta"-gallate, and/or a combination thereof. It should also be appreciated that the initial pre-conversion first oxide layer can be provided over or on top of the porous layer 302 using a vapor deposition method, a liquid dipping method, a casting method and the like known to those skilled in the art.

Figure 6:
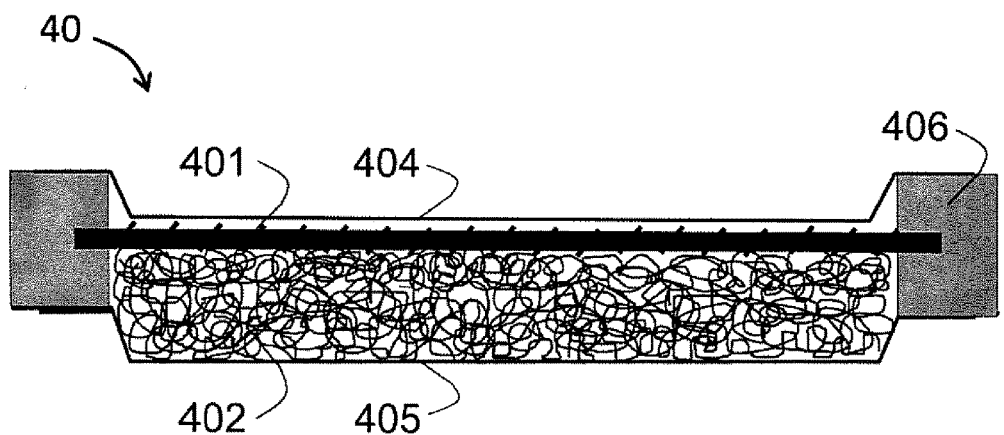
FIG. 6 is a schematic illustration of a battery cell with the solid electrolyte shown in FIG. 5.

FIG. 6 illustrates a battery cell at reference numeral 40 in which a thin, dense, nonporous layer 401 is equivalent to the thin, dense, nonporous layer 301 shown in FIG. 5 and a porous layer 402 is equivalent to the porous layer 302 shown in FIG. 5. The battery cell 40 can have an anode casing 404, cathode casing 405, and alpha-alumina sealing 406. As such, anode material can be present between the anode casing 404 and the thin layer 401 while cathode material can be present within the porous layer 402 between the cathode casing 405 and the thin, dense, nonporous layer 401.

The anode material can include one or more alkali metals. In some instances, one or more alkali metals in a liquid state can be the anode material, while the cathode material can be sulfur or a sulfur-containing material. In the alternative, the anode material can be sodium and the cathode material can be a porous nickel chloride impregnated with sodium tetrachloro aluminate. For example, the anode material can be liquid sodium and the cathode material can be sulfur. In the alternative, the anode material can be a combination of sodium and potassium in the liquid state, with a sulfur cathode material, and the electrolyte layer 401 has been produced such that the conduction of sodium and potassium ions through the layer occurs at such a rate and ratio that the sodium-potassium liquid alloy does not undergo solidification due to the depletion and/or enrichment of the alloying elements.

Figure 7:
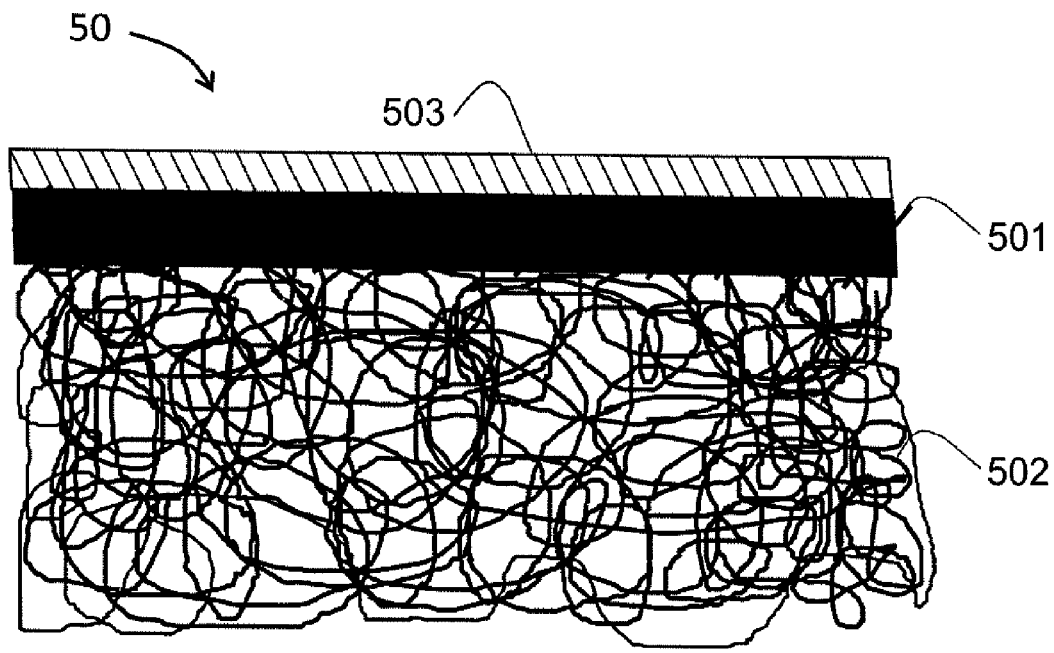
FIG. 7 is a schematic illustration of the solid electrolyte shown in FIG. 5 with an alkali-metal ion conductive layer extending across the solid second oxide electrolyte layer.
Figure 8:
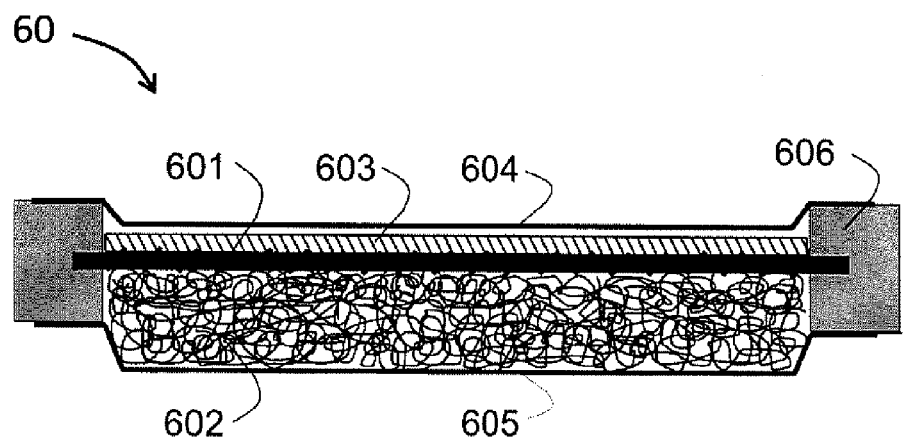
FIG. 8 is a schematic illustration of a battery cell with the solid electrolyte and alkali-metal ion conductive layer shown in FIG. 7.

Referring now to FIG. 7, a solid electrolyte with an alkali-metal ion conductive layer 503 extending across a solid second oxide electrolyte layer 501 is shown generally at reference numeral 50. It is appreciated that the layers 501 and 502 are equivalent to the layers 301 and 302, respectively, shown in FIG. 5. The layer 503 can be in the form of lead, a zintl phase, and the like. In addition, the layer 503 can improve the wettability of the anode material with the solid electrolyte 50 and thereby improve the performance of a battery cell, such as the battery cell 60 shown in FIG. 8. The battery cell 60 has a thin layer 601 which is equivalent to the layer 501 shown in FIG. 7, along with the alkali-metal ion conductive layer 603 which is equivalent to the layer 503.

The battery cell 60 also has an anode casing 604, a cathode casing 605, and a sealing structure 606 therebetween. The anode material can be present between the anode casing 604 and a top surface of the layer 603 while the cathode material can be present between the cathode casing 605 and a bottom surface of the solid second oxide layer 601. The layer 603 provides improved wettability of the electrolyte with the anode material and protects the electrolyte from dendrite failure, therefore allowing the utilization of a solid alkali metal anode material.

Figure 9:
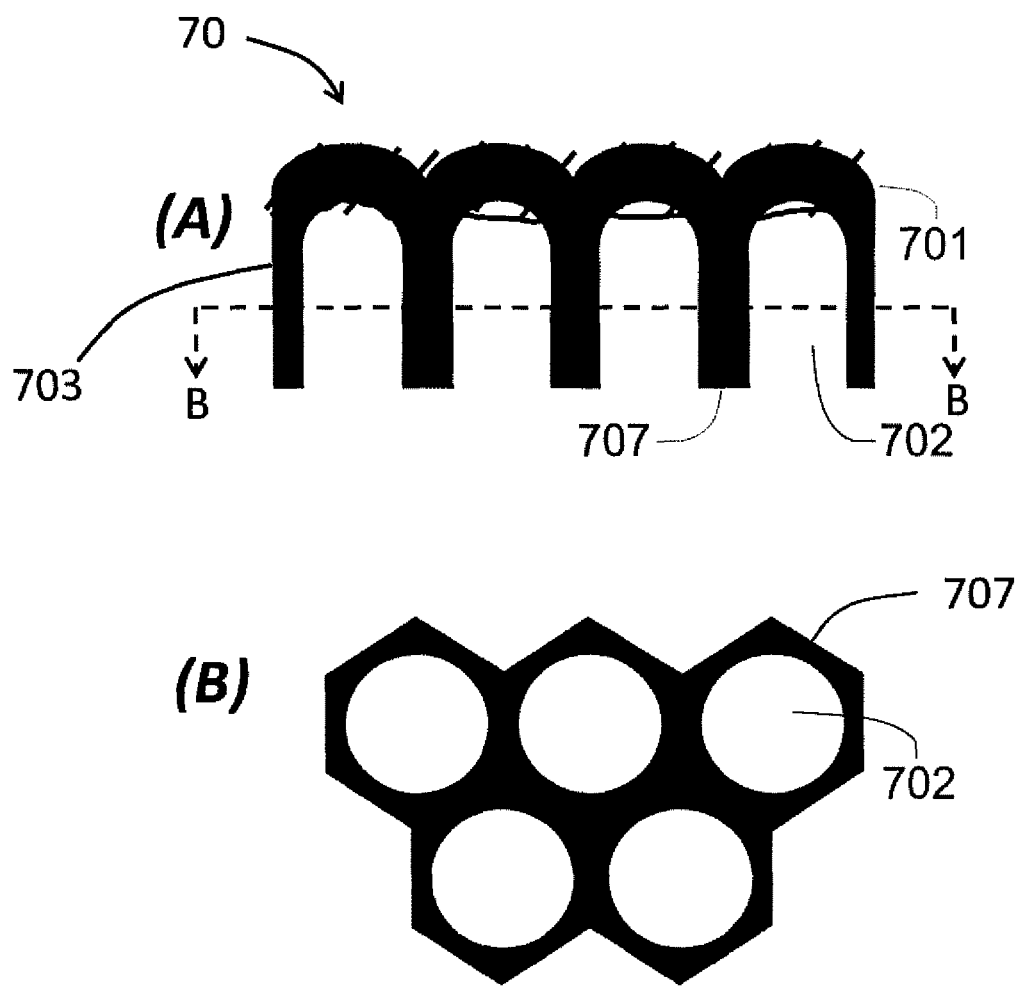
FIG. 9A is a schematic illustration of a side cross-sectional view of an anodic aluminum membrane having a thin, dense, nonporous solid second oxide electrolyte layer produced according to an embodiment of the present invention.
FIG. 9B is a schematic illustration of a top cross-sectional view of section B-B shown in FIG. 9A.

Turning now to FIG. 9, a side cross-sectional view is shown in FIG. 9A and a top cross-sectional view is shown in FIG. 9B for an electrolyte based on an anodic aluminum oxide membrane formed from aluminum foil as is known to those skilled in the art. The electrolyte based on the anodic aluminum oxide membrane can have inner hollow channels 702 with adjacent or bounding walls 707 that produce a porous layer 703 covered by a thin second oxide barrier layer 701. The walls 707 can be in the form of a hexagon and the thin barrier layer 701, along with a portion of the walls

707, can be converted from a first oxide to a second oxide as discussed above. In addition, an alkali-metal ion conducting layer 803 can be deposited onto the thin second oxide layer 701, preferably at the anode side as shown in FIGS. 10 A and B at reference numeral 80.

Figure 10:
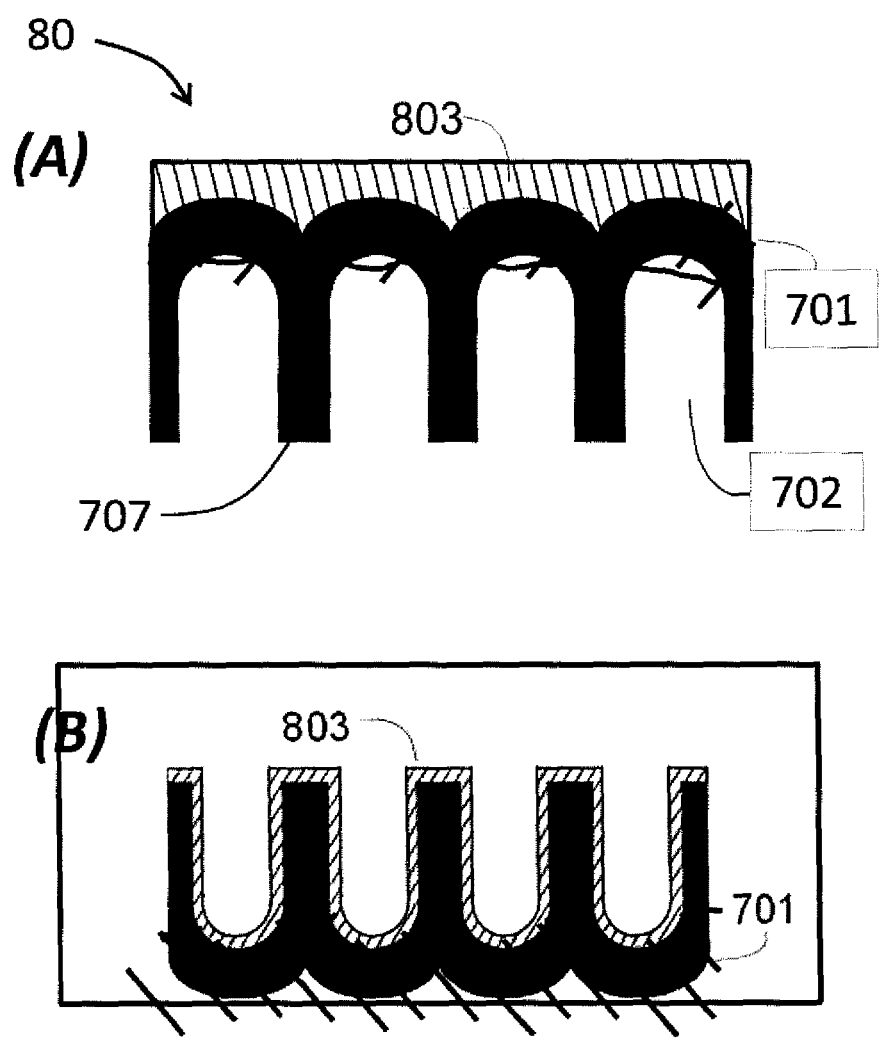
FIG. 10A is a schematic illustration of the solid electrolyte shown in FIG. 9A with an alkali-metal ion conductive layer applied at the barrier layer side of the anodic aluminum membrane extending across the thin, dense, nonporous solid second oxide electrolyte layer.
FIG. 10B is a schematic illustration of the solid electrolyte shown in FIG. 9A with an alkali-metal ion conductive layer applied at the porous layer side of the anodic aluminum membrane and coating one side of the solid electrolyte completely.
Figure 11:
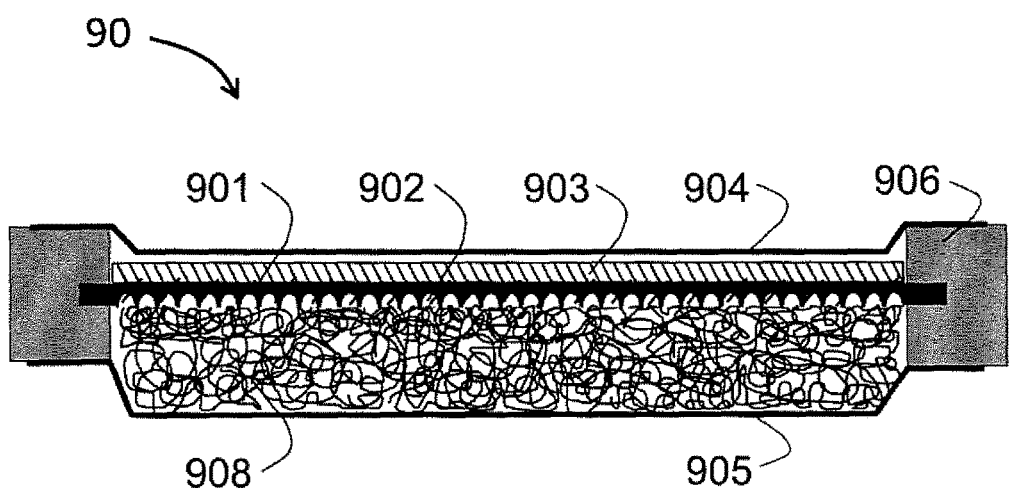
FIG. 11 is a schematic illustration of a battery cell with the solid electrolyte shown in FIG. 10A.

Finally, FIG. 11 provides a schematic illustration of a battery cell at reference numeral 90 with a thin, dense electrolyte layer 901, porous layer 902, and alkali-metal ion conductive layer 903 that are equivalent to layers 701, 702 and 703, respectively, as taught in FIGS. 9 and 10. In addition, the battery cell 90 has an anode casing 904 and a cathode casing 905 with a porous structure 908 between the cathode casing 905 and the electrolyte layer 901/902. The porous structure 908 can be in the form of carbon-nanofoam, porous alumina, and the like, and a sealant end or structure 906 can be used to make a sealed sodium sulfur battery, an alkali-metal halide battery and the like.

In summary, a low internal resistance beta-alumina, beta"-alumina, beta-gallate and/or beta"-gallate electrolyte produced according to an embodiment of the present invention provides a robust electrolyte for an alkali-metal sulfur battery or an alkali-metal halide battery. The solid electrolyte is not susceptible to moisture and the generally small thickness better compensates small pressure differences between compartments of anode and cathode materials. Furthermore, the alkali-metal ion conducting layer provides improved wettability of the electrolyte with an alkali-metal anode material and protects the low internal resistance beta-alumina, beta"-alumina, beta-gallate and/or beta"-gallate electrolyte from alkali-metal dendrite failure and thus allows for operating temperatures of the battery cells to be lowered to a point in which the anode material is in the solid state.

While the invention has been described with reference to certain specific embodiments and examples, it will be recognized by those skilled in the art that many variations are possible without departing from the scope and spirit thereof. As such, it is the claims, and the equivalents thereof, that define the scope of the invention.

We claim:

1. A process for making a solid electrolyte for an electrochemical cell, the process comprising:
   providing a multilayer material having a porous layer and a nonporous layer, the nonporous layer consisting of an anodic aluminum oxide membrane;
   providing an alkali-metal oxide vapor; and
   exposing the nonporous layer to the alkali-metal oxide vapor at an elevated temperature, the alkali-metal oxide vapor converting the nonporous layer to a solid second oxide electrolyte layer that is conductive to alkali metal ions, the second oxide selected from a group consisting of alkali-metal-beta-alumina, alkali-metal-beta"-alumina and combinations thereof.

2. The process of claim 1, wherein the solid second oxide electrolyte layer has an alkali-metal ion conductive layer extending thereacross and providing improved wettability with an alkali metal anode material.

3. The process of claim 2, wherein the alkali-metal ion conductive layer is selected from a group consisting of lead and a zintl phase material.

4. The process of claim 1, wherein the alkali-metal oxide vapor is selected from a group consisting of sodium oxide, lithium oxide, potassium oxide, rubidium oxide, cesium oxide and combinations thereof, and the solid second oxide electrolyte layer is conductive to ions, selected from a group consisting of sodium ions, lithium ions, potassium ions, rubidium ions, cesium ions and combinations thereof.

5. The process of claim 1, wherein the alkali-metal oxide vapor is sodium oxide.

6. The process of claim 1, wherein the alkali-metal oxide vapor contains sodium oxide and potassium oxide and the solid second oxide electrolyte layer is conductive to sodium ions and potassium ions.

7. The process of claim 1, wherein the alkali-metal oxide vapor contains a stabilizing ion with a valence equal to or less than an element of the boron group in order to make the solid oxide electrolyte layer more conductive to alkali-metal ions of the said alkali-metal oxide vapor.

8. The process of claim 7, wherein the stabilizing ion is selected from a group consisting of lithium and magnesium.

9. The process of claim 1, wherein the elevated temperature is equal to or less than 1350° C.

10. The process of claim 1, wherein the elevated temperature is equal to or less than 800° C.

11. The process of claim 1, wherein the multilayer material is formed by providing a porous base layer and applying a nonporous thin film onto the porous base layer.

12. The process of claim 11, wherein the porous base layer is selected from a group consisting of carbon-nanofoam, porous alpha-alumina, porous gamma-alumina and porous alpha-gallium oxide.

* * * * *